(12) United States Patent
Tofte et al.

(10) Patent No.: US 9,321,408 B2
(45) Date of Patent: Apr. 26, 2016

(54) BICYCLE TRANSPORTATION DEVICE

(71) Applicants: Christian Tofte, Cottonwood Heights, UT (US); Dusty Goble, Cottonwood Heights, UT (US)

(72) Inventors: Christian Tofte, Cottonwood Heights, UT (US); Dusty Goble, Cottonwood Heights, UT (US)

(*) Notice: Subject to any disclaimer, the term of this patent is extended or adjusted under 35 U.S.C. 154(b) by 144 days.

(21) Appl. No.: 14/160,702

(22) Filed: Jan. 22, 2014

(65) Prior Publication Data

US 2015/0203051 A1    Jul. 23, 2015

(51) Int. Cl.
*B60R 9/10* (2006.01)
*B60R 9/06* (2006.01)

(52) U.S. Cl.
CPC .... *B60R 9/10* (2013.01); *B60R 9/06* (2013.01)

(58) Field of Classification Search
CPC .................................. B60R 9/06; B60R 9/10
USPC ......................... 224/402, 534, 537, 924, 907
See application file for complete search history.

(56) References Cited

U.S. PATENT DOCUMENTS

| | | | | |
|---|---|---|---|---|
| 4,265,232 A * | 5/1981 | Stonich | ..................... | A61F 5/37 128/877 |
| 5,060,638 A * | 10/1991 | Bodine, Jr. | ............ | A61F 5/3761 128/845 |
| 5,456,398 A * | 10/1995 | Allen | ....................... | B60R 9/06 224/329 |
| 5,695,103 A * | 12/1997 | Duvernay | ................. | B60R 9/10 224/502 |
| 5,738,258 A * | 4/1998 | Farrow | ..................... | B60R 9/08 224/309 |
| 6,092,706 A * | 7/2000 | Bogan | ....................... | B60R 9/06 224/401 |
| 6,367,673 B1 * | 4/2002 | Smith | ...................... | B60R 9/00 224/403 |
| 7,766,202 B2 * | 8/2010 | Depot | ...................... | B60R 9/06 224/504 |
| 7,857,179 B1 * | 12/2010 | Allen | ....................... | B60R 9/06 224/329 |
| 2012/0118928 A1 * | 5/2012 | Laws | ....................... | B60R 9/10 224/403 |
| 2014/0197213 A1 * | 7/2014 | Shearer | .................... | B60R 9/10 224/29.5 |

* cited by examiner

*Primary Examiner* — Gary Elkins

(57) ABSTRACT

A bicycle transportation device that can be removably attached to any bicycle for transportation of the bicycle in the bed of a truck. The bicycle transportation device can be attached to the bike without the need to install hardware on the bicycle and carried securely in the bed of a truck without the need to make any modifications to the truck bed or to install any hardware on the truck anywhere.

6 Claims, 5 Drawing Sheets

BICYCLE TRANSPORTATION DEVICE

CROSS REFERENCE TO RELATED APPLICATION

This application claims the benefit of U.S. Provisional Application Ser. No. 61/801,798 filed Apr. 5, 2013 by Christian Tofte and Dusty Goble.

FIELD OF THE INVENTION

The present invention relates generally to the field of bicycle transportation devices, and more particularly to a device for transporting bicycles in the back of a truck.

BACKGROUND OF THE INVENTION

With increased popularity of biking, both mountain and road, more people are transporting bicycles to the areas they desire to ride them. Those using trucks to transport their bicycles will often just set the bicycle in the bed of the truck. Many bicycles are very expensive, and it is nor prudent to leave them to shift around in the bed of a truck. There are available bicycle racks that can be installed in the bed of a truck, but these racks can then get in the way of using the truck for other purposes, such as hauling materials in the bed of the truck. The user is forced to remove the bicycle rack when using the truck as something other than a bicycle hauler and then reinstall the rack when it is time to transport a bicycle. Some have attempted to use a pad that protects the truck bed and allows the user to hang a wheel of a bicycle over the pad. This does not however prevent the bicycle from shifting around and potentially being damaged.

There is a need for a way to transport a bicycle in the bed of a truck or other vehicle that provides adequate protection for the bicycle by preventing it from shifting in the bed of the truck, that allows for easy installation and that eliminates the need to attach and remove hardware from the truck or the bicycle.

SUMMARY OF THE INVENTION

This invention provides a way for the secure and safe transport of a bicycle in the back of a truck by hanging the front tire over the side or tailgate of the truck.

In one aspect of the invention, it provides an improved bicycle transportation device that can be used on virtually any pickup truck without the need to install hardware on the truck.

In another aspect of the invention, it provides an improved bicycle transportation device that prevents a bicycle from moving around during transportation.

In another aspect of the invention, it provides an improved bicycle transportation device that can be used with virtually any bicycle without the need to dissemble the bicycle in any way.

To the accomplishment of the above and related aspects, the invention may be embodied in the form illustrated in the accompanying drawings. The drawings, however, are illustrative only. Variations are contemplated as being part of the invention, limited only by the scope of the claims.

DETAILED DESCRIPTION OF THE INVENTION

The bicycle transportation device disclosed herein improves upon prior devices in that a bicycle can be conveniently, quickly, and securely placed in the bed of a truck without the need to remove the wheels/tires on the bicycle and without the need to install any hardware on the truck. The device disclosed herein can be attached to virtually any bicycle in a matter of seconds, costs a fraction of the price of existing racks and pads, and can be used on any truck because of the unique tailgate lip taper 15 shown in FIG. 1.

Figure 1:
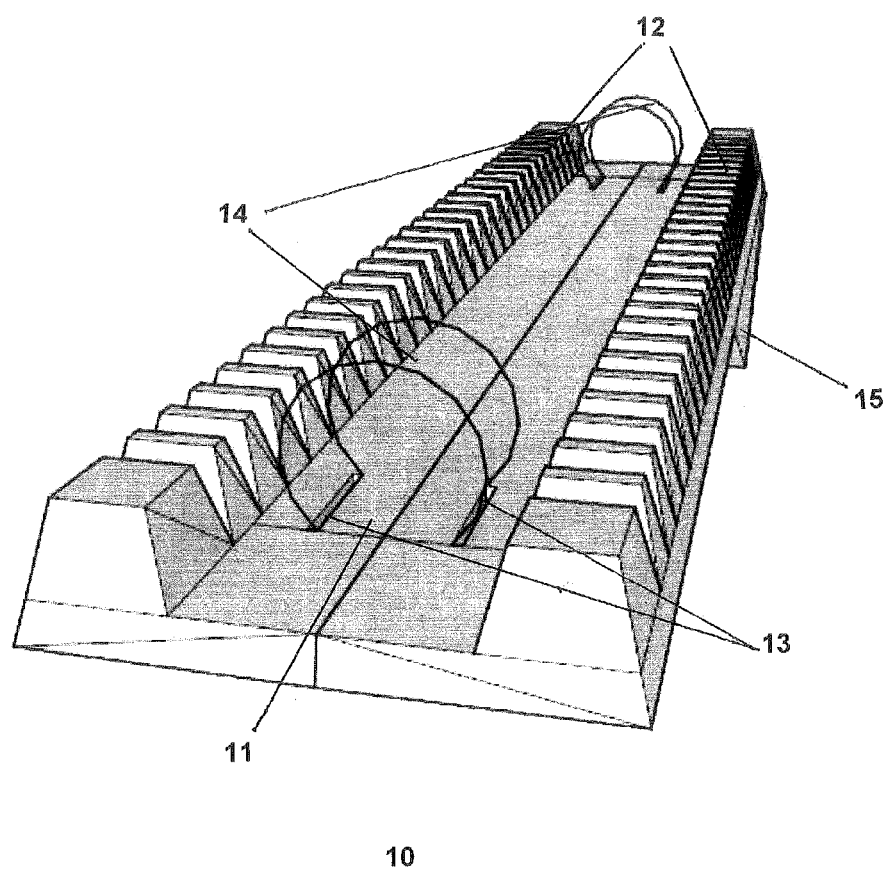
FIG. 1 is a perspective view of the top and side of the present invention.

As shown in FIG. 1, the improved bicycle transportation device 10 consists of frame/fork cradle 11, bicycle security bumpers 12, frame/fork strap voids 13, frame/fork straps 14 and tailgate lip taper 15. The frame/fork of a bicycle rests on frame/fork cradle 11 between bicycle security bumpers 12 on either side of the fork/frame. The bicycle transportation device 10 is attached to the bicycle by the use of frame/fork straps 14, which pass through frame/fork strap voids 13 in frame/fork cradle 11 and then go around either the frame or fork of the bicycle being secured for transportation, depending on the shape of the bed tailgate or side. In securing bicycle transportation device 10 to the fork, the user must necessarily slightly turn the handle bar of the bicycle to align the fork with frame/fork cradle 11.

Figure 2:
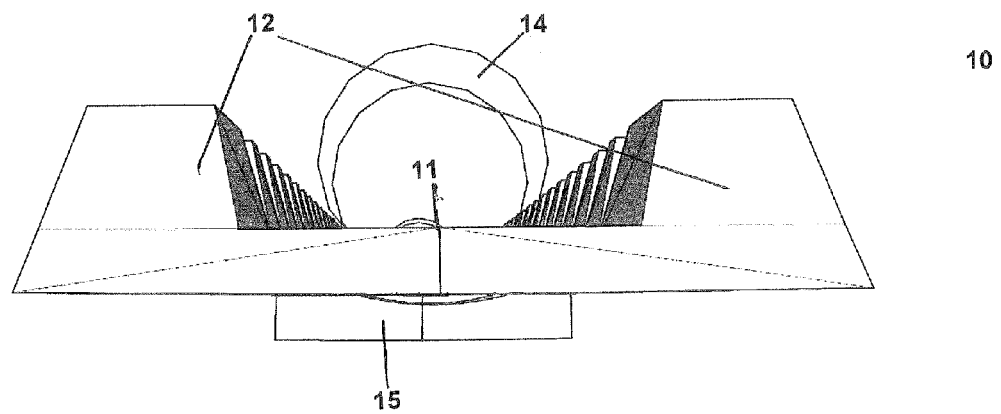
FIG. 2 is a view from the end of the present invention.
Figure 3:
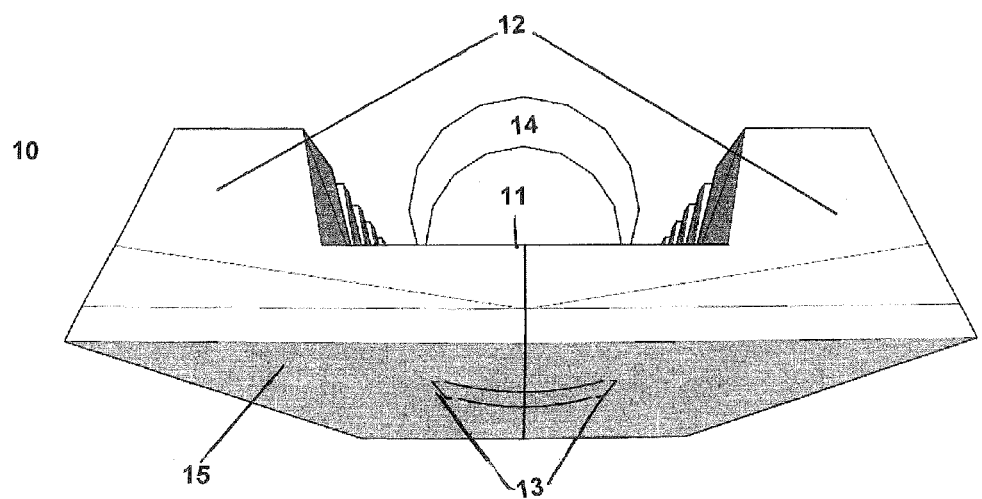
FIG. 3 is a perspective view of the other end of present invention.
Figure 7:
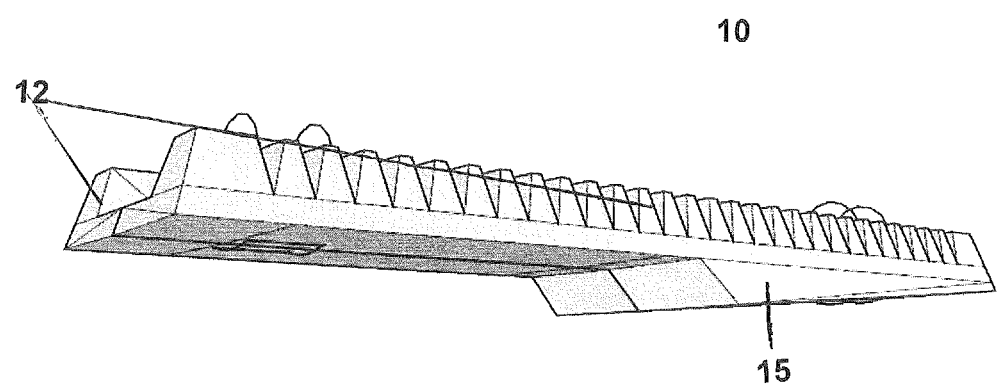
FIG. 7 is a perspective view of the side and bottom of the present invention.

One end of bicycle transportation device 10 is tapered as is shown in FIGS. 2, 3 and 7. FIG. 2 provides a perspective view from the thinner end of bicycle transportation device 10 and shows tailgate lip taper 15 at the other end of bicycle transportation device 10. FIG. 3 is a perspective view from the tapered end of bicycle transportation device 10 where tailgate lip taper 15 is located. Tailgate lip taper 15 permits the user to use bicycle transportation device 10 with a variety of truck tailgate and side shapes. If the tailgate or sides of the truck bed have a lip, the thicker end of bicycle transportation device 10 is secured to the fork of the bicycle by a frame/fork strap 14 and tailgate lip taper 15 prevents the bicycle from moving during transportation. If the truck tailgate sides do not have a lip, the user can attach tailgate lip taper 15 to either the fork or the frame depending on what creates a tighter fit against the truck tailgate or sides. FIG. 7 shows the taper present in tailgate lip taper 15.

Figure 4:
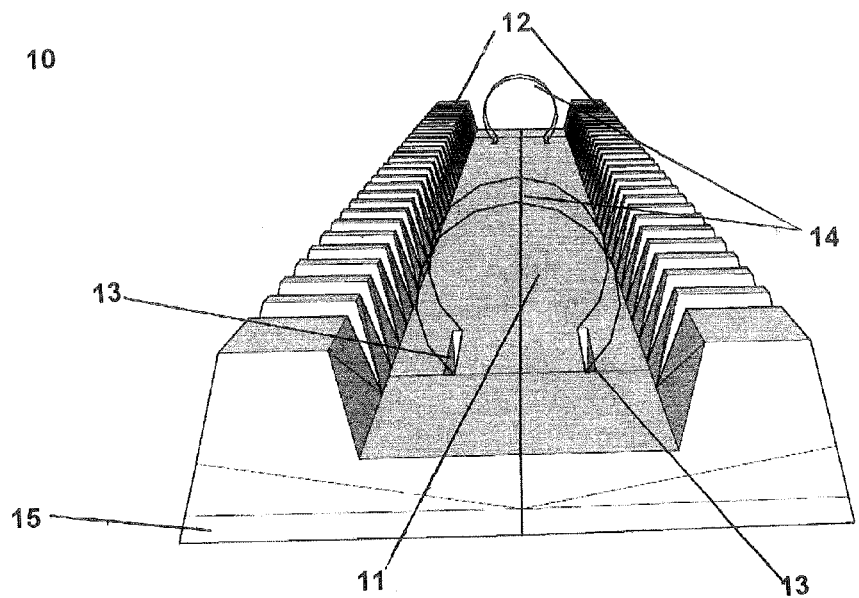
FIG. 4 is a perspective view of top of the present invention.
Figure 5:
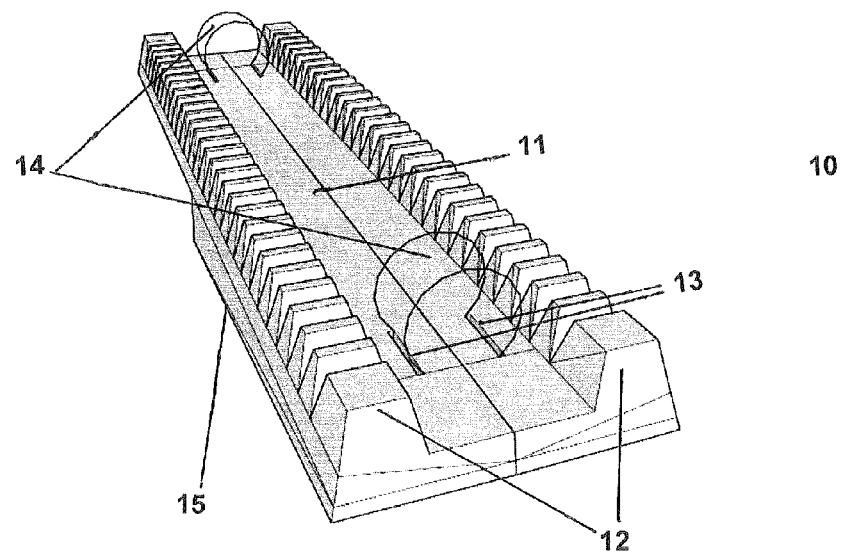
FIG. 5 is a perspective view of the top and side of the present invention.

Bicycle transportation device 10 is preferably made out of a non-rigid material allowing frame/fork cradle 11 and bicycle security bumpers 12 to move flexibly when being installed on a bicycle by frame/fork straps 14. Frame/fork straps 14 are shown in a closed or looped position in FIGS. 4 and 5.

Figure 6:
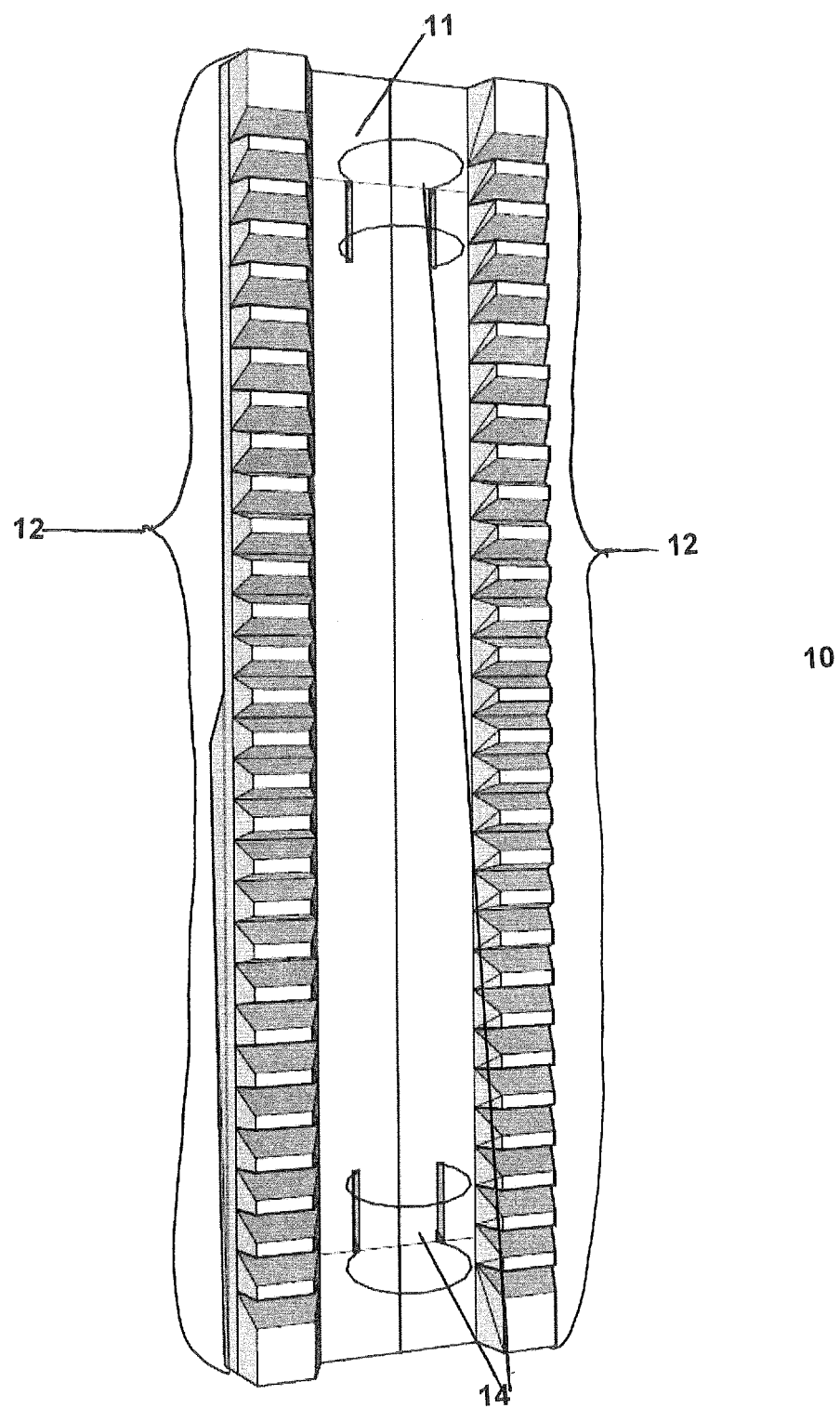
FIG. 6 is a view of the top of the present invention.

As shown in FIG. 6, frame/fork cradle 11 is of a sufficient width that bicycle transportation device 10 can be attached to virtually any bicycle, including, but not limited to, road bikes, mountain bikes and cruiser bikes. With the frame/fork cradle 11 pressed against the underside of the bicycle frame and against the bicycle fork, bicycle security bumpers 12, which extend above the sides of frame/fork cradle 11, grip the sides of the frame and fork as frame/fork straps 14 secure bicycle transportation device 10 to the bicycle."

Bicycle transportation device 10 is different from a tailgate pad or other existing devices because it is for a bicycle only and does not attach to the pickup truck. It uses bicycle security bumpers 12 to keep the fork and frame in the smaller surface area of the pickup truck tailgate or side. It is understood that rails or guides could also be used in place of bicycle security bumpers 12. Bicycle transportation device 10 can be attached to a bicycle in virtually seconds, permitting the user to quickly lift the bike into place on the truck bed. It does not require the user to install any hardware on the truck or bicycle. It replaces the need for installing a rack within the bed of the truck, which would need to be removed if the truck were being used to haul other materials in the back. It also replaces know bicycle racks that attach to the hitch, often included on the back of a truck.

One of the main advantages of the improved bicycle transportation device are storage size and ease of use. It takes up a fraction of the space used by known tailgate pads or truck bed or truck hitch bicycle racks. It can easily be stored underneath a seat in the truck cab because of its compact size. If a user desired to attach the improved bicycle transportation device even more securely, it could include magnets or straps to secure it to the truck bed.

The description of the invention above should not be interpreted as limiting the invention to the disclosed embodiment because those who are skilled in the art to which the invention relates will be able to devise other equivalent forms thereof within the scope of the invention. Variations and changes, which are obvious to one skilled in the art, are intended to be within the scope and nature of the present invention.

What is claimed is:

1. A bicycle transportation device comprising:
    an elongated body made of a flexible material having a first end, a second end, a top side, and a bottom side, wherein each side has two edges,
        the top side comprising a plurality of corrugated ridges along its edges and a substantially flat surface between the plurality of corrugated ridges, the plurality of corrugated ridges and the substantially flat surface forming a frame/fork cradle;
    a frame/fork strap; and
    a tailgate lip on the bottom side, the tailgate lip having a base substantially equidistant from the first end and the second end,
    wherein the device flexes at the base of the tailgate lip so that a frame of a bicycle and a fork of the bicycle can simultaneously rest in the frame/fork cradle.

2. The bicycle transportation device of claim 1, wherein the tailgate lip consists of the first end of the bicycle transportation device being thicker than the second end.

3. The bicycle transportation device of claim 1, wherein there are at least two frame/fork straps.

4. The bicycle transportation device of claim 2 wherein the tailgate lip is thicker than either the first end or the second end.

5. The bicycle transportation device of claim 3, wherein the at least two frame/fork straps are located on the first end and the second end of the body.

6. The bicycle transportation device of claim 1, further comprising a plurality of magnets on the bottom side to secure the device to a truck bed or tailgate.

\* \* \* \* \*